US011081902B2

(12) United States Patent
Jang et al.

(10) Patent No.: US 11,081,902 B2
(45) Date of Patent: Aug. 3, 2021

(54) POWER SUPPLY DEVICE AND POWER SUPPLY SYSTEM INCLUDING POWER SUPPLY DEVICE

(71) Applicant: SAMSUNG ELECTRONICS CO., LTD., Suwon-si (KR)

(72) Inventors: Du Hee Jang, Suwon-si (KR); Jeong Il Kang, Yongin-si (KR); Min Gyu Yoon, Suwon-si (KR); Seung Ho Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 69 days.

(21) Appl. No.: 16/471,710

(22) PCT Filed: Jan. 17, 2018

(86) PCT No.: PCT/KR2018/000783
§ 371 (c)(1),
(2) Date: Jun. 20, 2019

(87) PCT Pub. No.: WO2018/139802
PCT Pub. Date: Aug. 2, 2018

(65) Prior Publication Data
US 2019/0334373 A1 Oct. 31, 2019

(30) Foreign Application Priority Data
Jan. 25, 2017 (KR) .................. 10-2017-0012282

(51) Int. Cl.
H02J 9/00 (2006.01)
F16P 3/00 (2006.01)
(Continued)

(52) U.S. Cl.
CPC ................ H02J 9/005 (2013.01); F16P 3/00 (2013.01); G09G 3/2092 (2013.01);
(Continued)

(58) Field of Classification Search
None
See application file for complete search history.

(56) References Cited

U.S. PATENT DOCUMENTS 3,778,633 A * 12/1973 DeVisser ............... H01H 3/264
307/64
5,189,600 A * 2/1993 Keck ................. H02M 3/33507
363/21.04
(Continued)

FOREIGN PATENT DOCUMENTS

JP 2008-066810 3/2008
JP 2013-089442 5/2013
(Continued)

OTHER PUBLICATIONS

Translation of description : JP 2008-066810 Kenichiro et al. Hitachi LTD Mar. 21, 2008.*
(Continued)

Primary Examiner — Rexford N Barnie
Assistant Examiner — Terrence R Willoughby
(74) Attorney, Agent, or Firm — Nixon & Vanderhye, P.C.

(57) ABSTRACT

A power supply device according to an embodiment of the disclosure includes a power supply unit including a first power supply unit transmitting standby power to an electronic device and a second power supply unit transmitting main power to the electronic device and a cable including a standby power transmission line transmitting the standby power to the electronic device, a main power transmission line transmitting the main power to the electronic device, a first detect line receiving a power-on signal for operating the second power supply unit from the electronic device, and a second detect line determining whether the power-on signal is received. The second power supply unit does not operate when at least one of the first detect line and the second detect (Continued)

line is opened and the power-on signal is not received. Moreover, various embodiment grasped through the disclosure are possible.

12 Claims, 3 Drawing Sheets

(51) Int. Cl.
  *G09G 3/20* (2006.01)
  *H02M 1/42* (2007.01)
  *H02M 3/22* (2006.01)
  *H02H 5/10* (2006.01)

(52) U.S. Cl.
  CPC ......... *G09G 2330/023* (2013.01); *H02H 5/10* (2013.01); *H02M 1/4208* (2013.01); *H02M 3/22* (2013.01)

(56) References Cited

U.S. PATENT DOCUMENTS

| | | | |
|---|---|---|---|
| 9,018,529 | B2 | 4/2015 | Sidlyarevich |
| 9,152,889 | B2 | 10/2015 | Kim |
| 2004/0105034 | A1* | 6/2004 | Libera .................... H04N 5/63 348/730 |
| 2012/0262950 | A1 | 10/2012 | Nate et al. |
| 2013/0100496 | A1 | 4/2013 | Kim |
| 2014/0096996 | A1 | 4/2014 | Sidlyarevich |
| 2016/0118900 | A1 | 4/2016 | Nate et al. |
| 2016/0227154 | A1* | 8/2016 | Kim .................. H04N 21/4436 |
| 2016/0308315 | A1 | 10/2016 | Horng et al. |

FOREIGN PATENT DOCUMENTS

| | | |
|---|---|---|
| JP | 2015-133907 | 7/2015 |
| KR | 10-2013-0043923 | 5/2013 |

OTHER PUBLICATIONS

Translation of description: JP 2015-133907 Satoshi et al. ROHM Co, LTD. Jul. 23, 2015.*
International Search Report for PCT/KR2018/000783 dated May 8, 2018, 4 pages, with English Translation.
Written Opinion of the ISA for PCT/KR2018/000783 dated May 8, 2018, 6 pages.

* cited by examiner

POWER SUPPLY DEVICE AND POWER SUPPLY SYSTEM INCLUDING POWER SUPPLY DEVICE This application is the U.S. national phase of International Application No. PCT/KR2018/000783 filed Jan. 17, 2018 which designated the U.S. and claims priority to KR Patent Application No. 10-2017-0012282 filed Jan. 25, 2017, the entire contents of each of which are hereby incorporated by reference.

TECHNICAL FIELD

The disclosure relates to a power supply device that does not supply power to an electronic device when a cable is opened and a power supply system including the power supply device.

BACKGROUND ART

A display device refers to a device displaying the image received from the outside or the image stored in an internal storage device. The display panel included in the display device may include a light emitting device such as an light emitting diode (LED), an organic light emitting diode (OLED), or the like for displaying an image by emitting light.

The power supply device may supply the power necessary to operate the display device. The power supply device may convert the power received from an external power source to supply the converted power to a display. The power supply device may convert alternating current (AC) power received from the external power source to direct current (DC) power to supply the converted DC power to the display.

When converting the AC power to the DC power, the power supply device may improve the power factor of the power supplied to the display device. The power supply device may improve the power factor of the received power to increase the efficiency of the power received by the display device.

The cable of a power supply device may be thickly covered with an insulating material for the safety of a user. As such, the cable may not match the design of a display device and may interfere with the concentration of the user employing the display device.

When the cable is cut in the case where a cable is manufactured using a transparent film made of an insulating material, the conductive line for transmitting the power is easily exposed to the outside, and thus there is the danger of electric shock. Moreover, when connectors at opposite ends of the cable are not completely inserted into at least one of the power supply unit and the display device, fire may easily occur due to heat generation in the contact area of the connector.

SUMMARY

Various embodiments of the disclosure provides a power supply device that may improve the safety by detecting a state where the power transmitted from the power supply unit is not received by the display device to turn off the power supply unit, and a power supply system including the power supply device.

A power supply device according to the disclosure may include a power supply unit including a first power supply unit transmitting standby power to an electronic device and a second power supply unit transmitting main power to the electronic device and a cable including a standby power transmission line transmitting the standby power to the electronic device, a main power transmission line transmitting the main power to the electronic device, a first detect line receiving a power-on signal for operating the second power supply unit from the electronic device, and a second detect line determining whether the power-on signal is received. The second power supply unit may not operate when at least one of the first detect line and the second detect line is opened and the power-on signal is not received.

A power supply system according to the disclosure may include a power supply unit including a first power supply unit transmitting standby power to an electronic device and a second power supply unit transmitting main power to the electronic device, a cable including a standby power transmission line transmitting the standby power to the electronic device, a main power transmission line transmitting the main power to the electronic device, a first detect line receiving a power-on signal for operating the second power supply unit from the electronic device, and a second detect line determining whether the power-on signal is received, and a power receiving unit of an electronic device configured to receive the standby power and the main power from the power supply unit via the cable and to transmit the power-on signal via the first detect line. The power receiving unit may not receive the main power because the second power supply unit does not operate when at least one of the first detect line and the second detect line is opened and the power-on signal is not received.

According to an embodiment of the disclosure, a power supply device and a power supply system including the same may include a detect line in a cable, may receive a power-on signal and a feedback signal of a standby power via the detect line, may detect that the cable is opened, through the power-on signal and the feedback signal when the cable is opened, may turn off a portion outputting a main power of the power supply device, and may discharge the charged energy of the power supply device, thereby preventing a user from electric shock.

Furthermore, the power that is being supplied may be blocked by detecting that a cable is opened, thereby ensuring the safety; the cable may be made of a transparent film of an insulating material; the cable made of a transparent film may match the design of a display device; because it is difficult for the user to recognize the cable, the cable may not interfere with the concentration of the user.

Besides, a variety of effects directly or indirectly understood through this disclosure may be provided.

DETAILED DESCRIPTION OF EXAMPLE EMBODIMENTS

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure. With regard to description of drawings, similar components may be marked by similar reference marks/numerals.

Figure 1:
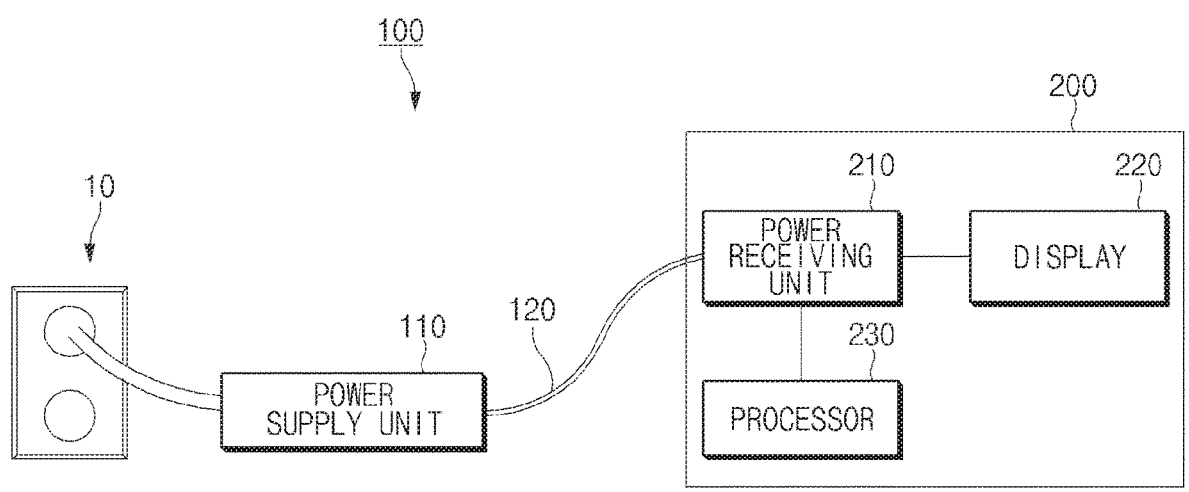
FIG. 1 is a view illustrating how a power supply device is connected to a display device to supply power, according to various embodiments of the disclosure.

FIG. 1 is a view illustrating how a power supply device is connected to a display device to supply power, according to various embodiments of the disclosure.

Referring to FIG. 1, a power supply device 100 may receive power from an external power source 10 to transmit the power to a display device (or an electronic device) 200.

According to an embodiment, the power supply device 100 may include a power supply unit 110 and a cable 120.

According to an embodiment, the power supply unit 110 may receive the power from the external power source 10 to transmit the power to the display device 200 via the cable 120. For example, the power supply unit 110 may convert AC power to DC power by rectifying the AC power received from the external power source 10. The power supply unit 110 may transmit the converted DC power to the display device 200 via the cable 120.

According to an embodiment, the power supply unit 110 may supply different power depending on the state of the display device 200. For example, when the display device 200 is in a ready state (or a standby state) capable of performing an operation of displaying an image on a display 220, the power supply unit 110 may supply the power of the specified value or less to the display device 200. For another example, when the power supply unit 110 is in a state (or an operating state) where the display device 200 performs an operation of displaying the image on the display 220, the power supply unit 110 may supply the power of the specified value to the display device 200. For example, the specified value may be the power value consumed by the display device 200 to display the image on the display 220.

According to an embodiment, the cable 120 may transmit the power output from the power supply unit 110 to the display device 200. For example, the cable 120 may transmit the supplied power to the display device 200 via the conductive line inside the cable 120.

According to an embodiment, the cable 120 may include a plurality of lines for transmitting the power. For example, the cable 120 may include a line for transmitting the power (or standby power) for operating some components when the display device 200 is in the standby state. The cable 120 may include a line for transmitting the power (or main power) for operating the remaining components other than some components when the display device 200 is in the operating state.

According to an embodiment, the display device 200 may include a power receiving unit 210, the display 220, and a processor 230.

According to an embodiment, the power receiving unit 210 may receive the power transmitted from the power supply unit 110 via the cable 120. According to an embodiment, the power receiving unit 210 may supply the received power to each component (e.g., the display 220, the processor 230, or the like) of the display device 200, as necessary power.

According to an embodiment, the display 220 may display an image (or a video image). For example, the display 220 may include a liquid crystal display (LCD) panel, an OLED panel, or a plasma display panel (PDP) to display an image.

According to an embodiment, the processor 230 may control overall operations of the display device 200. For example, the processor 230 may control the power receiving unit 210 and the display 220 to display an image on the display 220.

According to an embodiment, the processor 230 may control the power receiving unit 210 to receive the power for displaying an image on the display 220, from the power supply unit 110. For example, when receiving a user input to display an image on the display 220 in the standby state, the processor 230 may transmit a power-on signal for receiving main power, to the power supply unit 110. As such, when receiving the power-on signal, the power supply unit 110 may transmit the main power to the display device 200 via the cable 120.

According to an embodiment, the processor 230 may control the display 220 to display an image. When displaying an image on the display 220, the display device 200 may receive the standby power and the main power from the power supply unit 110.

The cable 120 of the power supply device 100 may be thickly covered with an insulating material for the safety of a user. As such, the cable 120 may not match the design of the display device 200 and may interfere with the concentration of the user employing the display device 200. When the cable 120 is cut in the case where the cable 120 is manufactured using a transparent film made of an insulating material, the conductive line for transmitting the power is easily exposed to the outside, and thus there is the danger of electric shock. Moreover, when connectors at opposite ends of the cable 120 are not completely inserted into at least one of the power supply unit 110 and the display device 200, fire may easily occur due to heat generation in the contact area of the connector. The power supply device 100 according to various embodiments of the disclosure may detect a state where the power transmitted from the power supply unit 110 is not received by the display device 200 to turn off the power supply unit 110, thereby improving the safety.

Figure 2:
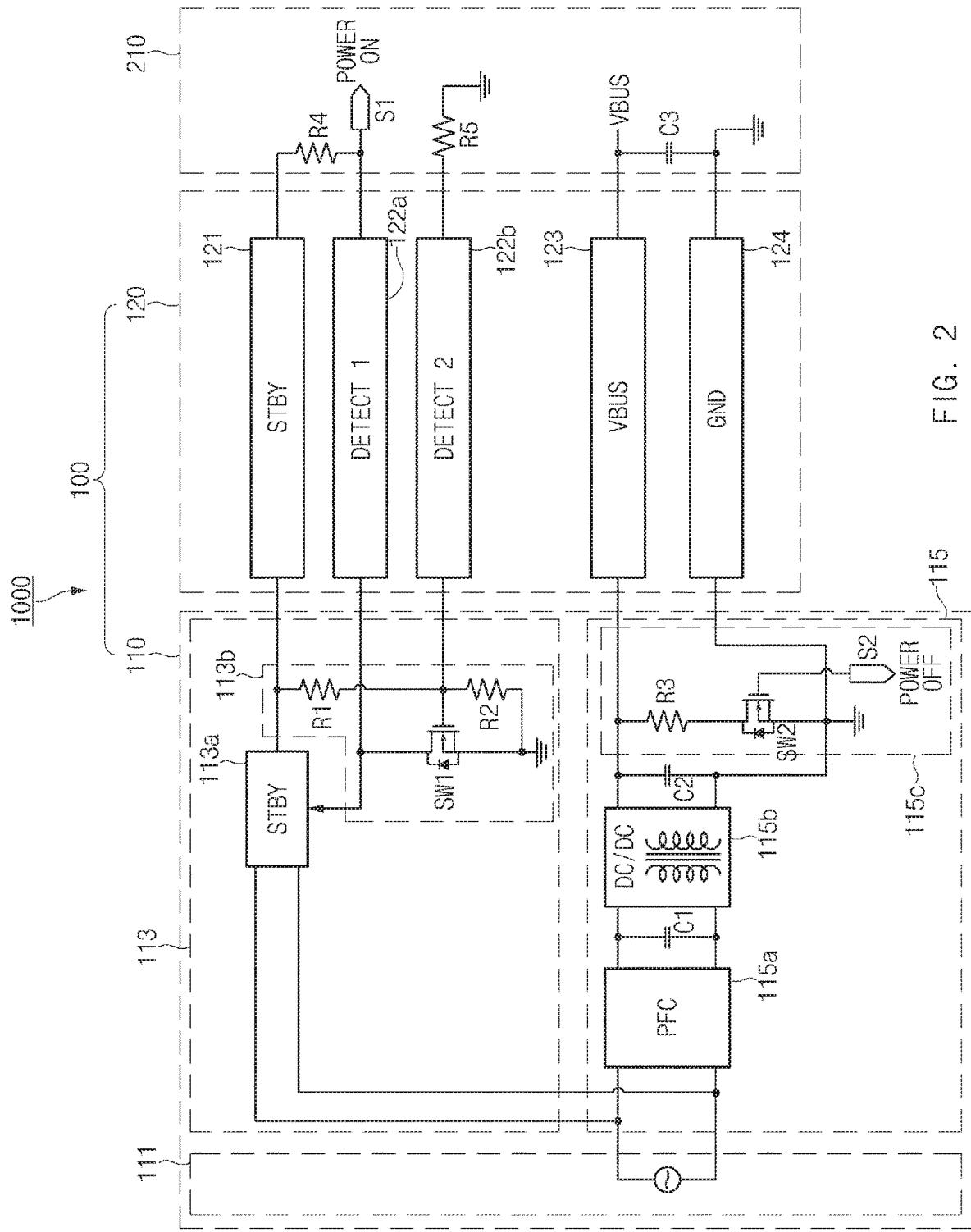
FIG. 2 is a circuit diagram illustrating a power supply device, according to an embodiment of the disclosure.

FIG. 2 is a circuit diagram illustrating a power supply device, according to an embodiment of the disclosure.

Referring to FIG. 2, a power supply system 1000 may include the power supply unit 110 and the cable 120 of the power supply device 100 and the power receiving unit 210 of the display device 200.

According to an embodiment, the power supply unit 110 may include a power receiving unit 111, a first power supply unit 113, and a second power supply unit 115.

According to an embodiment, the power receiving unit 111 may receive power from the external power source 10. For example, the power receiving unit 111 may receive AC power from the external power source 10. For example, the AC power may be converted to DC power by the first power supply unit 113 and the second power supply unit 115 to transmit the DC power to the display device 200. For another example, the AC power may be converted to the DC power by a rectifier (e.g., a bridge diode circuit), which is a component different from the first power supply unit 113 and the second power supply unit 115 to supply the DC power to the display device 200.

According to an embodiment, the first power supply unit 113 may supply standby power to the display device 200. For example, the standby power may be supplied to the display device 200 in not only a standby state of the display device 200 but also an operating state. According to an embodiment, the first power supply unit 113 may include a standby power generating unit 113a and a blocking circuit 113b.

According to an embodiment, the input terminal of the standby power generating unit 113a may be electrically connected to the power receiving unit 111, and the output terminal of the standby power generating unit 113a may be electrically connected to a standby power transmission line 121 of the cable 120.

According to an embodiment, the standby power generating unit 113a may transmit the standby power, which is the power received from the power receiving unit 111, to the display device 200 via the transmission line 121. For example, the standby power generating unit 113a may convert and transmit the received power to the necessary power of the display device 200. According to an embodiment, the output terminal of the standby power generating unit 113a may be the output terminal of the first power supply unit 113.

According to an embodiment, the standby power generating unit 113a may be electrically connected to a first detect line 122a of the cable 120 and may receive a power-on signal S1 (e.g., a high signal) from the display device 200. According to an embodiment, the signal for controlling the state of the second power supply unit 115 may be generated based on the power-on signal S1 received by the standby power generating unit 113a.

According to an embodiment, the blocking circuit 113b may be electrically connected to the first detect line 122a of the cable 120. For example, the blocking circuit 113b may include a first switch SW1 that blocks the power-on signal S1 (e.g., a high signal) transmitted via the first detect line 122a when the blocking circuit 113b is electrically connected to the first detect line 122a and is turned on. For example, the voltage of the output terminal of the standby power generating unit 113a may be applied to the gate of the first switch SW1. The voltage of the output terminal of the standby power generating unit 113a may be divided by a first resistor R1 and a second resistor R2 and may be applied to the gate of the first switch SW1. According to an embodiment, the blocking circuit 113b may be electrically connected to a second detect line 122b of the cable 120. For example, the second detect line 122b may be electrically connected to the gate of the first switch SW1 to determine the voltage applied to the gate of the first switch SW1. The second detect line 122b may determine the voltage applied to the gate of the first switch SW1 by a resistor electrically connected in the power receiving unit 210 of the display device 200. As such, the first switch SW1 may be turned on or off by the voltage applied to the gate.

According to an embodiment, the second power supply unit 115 may supply main power to the display device 200. The second power supply unit 115 may further include a power factor correction unit 115a, a DC/DC converter unit 115b, and a discharge circuit 115c.

According to an embodiment, the input terminal of the power factor correction unit 115a may be electrically connected to the power receiving unit 111, and the output terminal of the power factor correction unit 115a may be electrically connected to the input terminal of the DC/DC converter unit 115b.

According to an embodiment, the power factor correction unit 115a may adjust the power factor of the power input from the power receiving unit 111 and may output the specified voltage. For example, the power factor correction unit 115a may adjust the power factor of the input power based on the voltage at the specified point of the second power supply unit 115 and may output the specified voltage. According to an embodiment, the power factor correction unit 115a may output the specified voltage via a first capacitor C1 connected to the output terminal of the power factor correction unit 115a. For example, the power factor correction unit 115a may charge the first capacitor C1 and may output voltage via the charged first capacitor C1.

According to an embodiment, the input terminal of the DC/DC converter unit 115b may be electrically connected to the output terminal of the power factor correction unit 115a, and the output terminal of the DC/DC converter unit 115b may be electrically connected to a main power transmission line 123 and a ground line 124.

According to an embodiment, the DC/DC converter unit 115b may convert and output the voltage input from the power factor correction unit 115a, into a specified gain. The voltage output from the DC/DC converter unit 115b may be transmitted to the power receiving unit 210 of the display device 200 via the main power transmission line 123. For example, the specified gain may be determined by the voltage necessary to drive the display device 200. According to an embodiment, the DC/DC converter unit 115b may output the voltage converted into the specified gain, via a second capacitor C2 connected to the output terminal of the DC/DC converter unit 115b. For example, the DC/DC converter unit 115b may charge the second capacitor C2 and may output voltage via the charged second capacitor C2. According to an embodiment, the output terminal of the DC/DC converter unit 115b may be the output terminal of the second power supply unit 115.

According to an embodiment, the power factor correction unit 115a and the DC/DC converter unit 115b may be turned on or off depending on the power-on signal S1 received via the first detect line 122a. For example, when the standby power generating unit 113a receives the power-on signal S1, the power factor correction unit 115a and the DC/DC converter unit 115b may be turned on to output the specified voltage. When the standby power generating unit 113a does not receive the power-on signal S1, the power factor correction unit 115a and the DC/DC converter unit 115b may be turned off and may not output the specified voltage.

According to an embodiment, the discharge circuit 115c may be electrically connected to the output terminal of the second power supply unit 115. The discharge circuit 115c may include a third resistor R3 and a second switch SW2 connected to the output terminal in series. The third resistor R3 may consume the energy charged in the first capacitor C1 and the second capacitor C2 to discharge the first capacitor C1 and the second capacitor C2. The second switch SW2 may receive a power-off signal S2 at the gate of the second switch SW2 to be turned on or off. According to an embodiment, the output of the power-off signal S2 input to the gate of the second switch SW2 may be determined based on the power-on signal S1 received via the first detect line 122a. For example, when the power-on signal S1 is not received via the first detect line 122a, the power-off signal S2 (e.g., a high signal) may be output; when the power-on signal S1 is received via the first detect line 122a, the power-off signal S2 may not be output.

According to an embodiment, the cable 120 may include the standby power transmission line 121, the first detect line 122a, the second detect line 122b, the main power transmission line 123, and the ground line 124.

According to an embodiment, the standby power transmission line 121 may be connected to the output terminal of the first power supply unit 113 to transmit the standby power to the display device 200. For example, the standby power transmission line 121 may be connected to the output terminal of the standby power generating unit 113a and may transmit the standby power output by the standby power generating unit 113a, to the display device 200.

According to an embodiment, the first detect line 122a may transmit the power-on signal from the display device 200 to the power supply unit 110. For example, the first detect line 122a may be electrically connected to the standby power generating unit 113a of the first power supply unit 113 and may transmit the power-on signal from the display device 200 to the standby power generating unit 113a.

According to an embodiment, when the first detect line 122a is opened, the power-on signal S1 may not be transmitted to the first power supply unit 113. For example, the first detect line 122a is cut and opened, the power-on signal S1 may not be transmitted to the first power supply unit 113. For another example, in the case where the first detect line 122a is opened because the connector is not in contact with a port when the connector of the cable 120 is not completely inserted, the power-on signal S1 may not be transmitted to the first power supply unit 113.

According to an embodiment, the second detect line 122b may be connected to the first switch SW1 of the blocking circuit 113b to determine the voltage applied to the first switch SW1. For example, the second detect line 122b may be connected to the gate of the first switch SW1 may determine the voltage applied to the gate of the first switch SW1 from the output terminal of the standby power generating unit 113a. For example, the second detect line 122b may determine the voltage applied to the gate of the first switch SW1 by a resistor electrically connected in the power receiving unit 210 of the display device 200. For example, when the second detect line 122b is opened, the voltage of a specified voltage value or more may be applied to the gate of the first switch SW1 and the first switch SW1 may be turned on. When the first switch SW1 is turned on, the power-on signal S1 transmitted via the first detect line 122a may be blocked.

As such, at least one of the first detect line 122a and the second detect line 122b is opened, the power supply unit 110 may fail to receive the power-on signal S1, and the second power supply unit 115 may not operate. In addition, the cable 120 may further include a plurality of detect lines 122b that are in a connection state the same as the second detect line 122b.

According to an embodiment, the main power transmission line 123 may be connected to the output terminal of the second power supply unit 115 to transmit main power to the display device 200. For example, the main power transmission line 123 may be connected to the output terminal of the DC/DC converter unit 115b, and may transmit the main power output by the DC/DC converter unit 115b, to the display device 200.

According to an embodiment, the ground line 124 may be connected to the ground port of the output terminal of the second power supply unit 115 and the ground port of the display device 200. The ground line 124 may electrically connect between the ground part of the second power supply unit 115 and the ground part of the display device 200. As such, the power output by the second power supply unit 115 may be transmitted via the main power transmission line 123.

According to an embodiment, the power receiving unit 210 may be electrically connected to the standby power transmission line 121 to receive standby power. For example, the power receiving unit 210 may receive the standby power to supply power necessary for the operations of some components.

According to an embodiment, the power receiving unit 210 may be electrically connected to the first detect line 122a to transmit the power-on signal to the display device 200. For example, the power receiving unit 210 may transmit the power-on signal corresponding to a user input to the power supply unit 110 via the first detect line 122a. For example, the user input may be an input to display an image on the display 220 of the display device 200. As such, when the power supply device 100 receives the power-on signal, the power supply device 100 may turn on the second power supply unit 115 to transmit the main power to the power receiving unit 210.

According to an embodiment, the power receiving unit 210 may transmit a feedback signal corresponding to the standby power received via the first detect line 122a, to the power supply unit 110. For example, the power receiving unit 210 may transmit a part of the received standby power as the feedback signal. The power receiving unit 210 may electrically connect the standby power transmission line 121 to the first detect line 122a such that the part of the received standby power is the feedback signal. A fourth resistor R4 may be connected between the standby power transmission line 121 and the first detect line 122a to transmit a part of the standby power as the feedback signal via the first detect line 122a electrically connected to the standby power transmission line 121. According to an embodiment, the power supply unit 110 may determine whether the feedback signal is received and may not turn on the second power supply unit 115. For example, when at least one of the first detect line 122a and the second detect line 122b is opened, the power supply unit 110 may fail to receive the feedback signal. The power supply unit 110 may not turn on the second power supply unit 115. As such, the power supply unit 110 may detect whether the first detect line 122a and the second detect line 122b are opened, using not only the power-on signal S1 but also the feedback signal.

According to an embodiment, the power receiving unit 210 may connect a fifth resistor R5 to the second detect line 122b. For example, the fifth resistor R5 may be a resistor, the resistor value of which is less than the second resistor R2 of the blocking circuit 113b of the first power supply unit 113. As such, the voltage applied to the first switch SW1 of the blocking circuit 113b may be voltage of less than a specified value. The specified value may be a voltage value for turning on the first switch SW1.

According to an embodiment, the power receiving unit 210 may be electrically connected to the main power transmission line 123 to transmit the main power. For example, for the purpose of outputting the voltage of the main power, the power receiving unit 210 may include a third capacitor C3 connected between the main power transmission line 123 and the ground. The third capacitor C3 may be charged using the main power received via the main power transmission line 123, and the voltage of the charged third capacitor C3 may be applied to each component of the display device 200.

According to an embodiment, the power receiving unit 210 may connect the ground line 124 to the ground. The ground part of the power receiving unit 210 and the ground part of the second power supply unit 115 may be electrically connected to each other. As such, the power receiving unit 210 may receive the power output by the second power supply unit 115, via the main power transmission line 123.

Hereinafter, the operation of the power supply device 100 in the case where the cable 120 is cut or a connector is not completely inserted when the power supply device 100 operates normally will be described with reference to FIG. 2.

When the cable 120 is connected normally, the power supply device 100 may transmit standby power to the display device 200 via the first power supply unit 113. For example, the power supply device 100 may transmit the standby power output by the standby power generating unit 113a of the first power supply unit 113, to the power receiving unit 210 of the display device 200 via the standby power transmission line 121. The power receiving unit 210 may supply the received standby power to some components of the display device 200.

According to an embodiment, the voltage of a specified value or less may be applied from the standby power generating unit 113a to the first switch SW1 of the blocking circuit 113b. For example, the fifth resistor R5 less than the second resistor R2 connected to the gate of the first switch SW1 may be connected to the second detect line 122b, and then the voltage of a specified value or less may be applied to the gate of the first switch SW1. As such, the blocking circuit 113b may not block the power-on signal S1 received by the first power supply unit 113.

According to an embodiment, the display device 200 may transmit the power-on signal S1 to the power supply unit 110. For example, the power receiving unit 210 of the display device 200 may transmit the power-on signal S1 to the standby power generating unit 113a of the first power supply unit 113 via the first detect line 122a. According to an embodiment, a control signal for turning on the second power supply unit 115 may be generated based on the power-on signal S1 received by the standby power generating unit 113a.

According to an embodiment, because the first power supply unit 113 receives the power-on signal S1, the second switch SW2 of the discharge circuit 115c may not receive the power-off signal S2. As such, because the second switch SW2 is turned off and thus the discharge circuit 115c does not operate, the energy charged in the first capacitor C1 and the second capacitor C2 may not be consumed by the discharge circuit 115c.

According to an embodiment, the second power supply unit 115 of the power supply unit 110 may be turned on and may transmit main power to the display device 200 via the main power transmission line 123. The power receiving unit 210 of the display device 200 may receive the main power and may supply necessary power to each component (e.g., the remaining components other than some components operating with standby power) of the display device 200.

As such, the display device 200 may receive the standby power and the main power and may display an image on the display 220.

According to an embodiment, the power supply device 100 may allow the first detect line 122a to be opened. For example, the first detect line 122a may be cut and opened. For another example, because the connector of the cable 120 is not completely inserted into the display device 200, the first detect line 122a may be opened.

According to an embodiment, the standby power may be transmitted to the display device 200 via the first power supply unit 113. The power receiving unit 210 of the display device 200 may supply the received standby power to some components of the display device 200.

According to an embodiment, when the display device 200 transmits the power-on signal S1 to the power supply unit 110, the first detect line 122a may be opened, and thus the power supply device 100 may fail to receive the power-on signal S1. As such, because being opened, the second power supply unit 115 of the display device 200 may fail to transmit the main power for the operation of the display device 200, to the display device 200.

According to an embodiment, because the first power supply unit 113 does not receive the power-on signal S1, the second switch SW2 of the discharge circuit 115c may receive the power-off signal S2. As such, because the second switch SW2 is turned on and the discharge circuit 115c operates, the discharge circuit 115c may consume the voltage charged in the first capacitor C1 and the second capacitor C2.

As such, the display device 200 may receive only the standby power to supply power to some components of the display device 200 and may fail to display an image on the display 220.

According to an embodiment, the power supply device 100 may allow the second detect line 122b to be opened. For example, the second detect line 122b may be cut and opened. For another example, because the connector of the cable 120 is not completely inserted into the display device 200, the second detect line 122b may be opened.

According to an embodiment, the standby power may be transmitted to the display device 200 via the first power supply unit 113. The power receiving unit 210 of the display device 200 may supply the received standby power to some components of the display device 200.

According to an embodiment, when the display device 200 transmits the power-on signal S1 to the power supply device 100, the second detect line 122b may be opened, and thus the power-on signal S1 may be blocked by the blocking circuit 113b. For example, the voltage of a specified value or more may be applied from the standby power generating unit 113a to the first switch SW1 of the blocking circuit 113b. Because the second detect line 122b is opened and the voltage of the standby power generating unit 113a is applied after being divided by the first resistor R1 and the second resistor R2, the voltage of a specified value or more may be applied to the gate of the first switch SW1. As such, the blocking circuit 113b may block the power-on signal S1 received by the first power supply unit 113 via the first detect line 122a.

According to an embodiment, because the first power supply unit 113 does not receive the power-on signal S1, the second switch SW2 of the discharge circuit 115c may receive the power-off signal S2. As such, because the second switch SW2 is turned on and the discharge circuit 115c operates, the discharge circuit 115c may consume the voltage charged in the first capacitor C1 and the second capacitor C2.

As such, the display device 200 may receive only the standby power to supply power to some components of the display device 200 and may fail to display an image on the display 220.

According to an embodiment, when the display device 200 displays an image on the display 220 (or is in an operating state), at least one of the first detect line 122a and the second detect line 122b may be opened. When at least one of the first detect line 122a and the second detect line 122b is opened, the first power supply unit 113 may fail to receive the power-on signal S1. As such, because the second power supply unit 115 is turned off, the display device 200 may not display an image on the display 220 but may receive only the standby power from the first power supply unit 113 to supply power to only some components.

Figure 3:
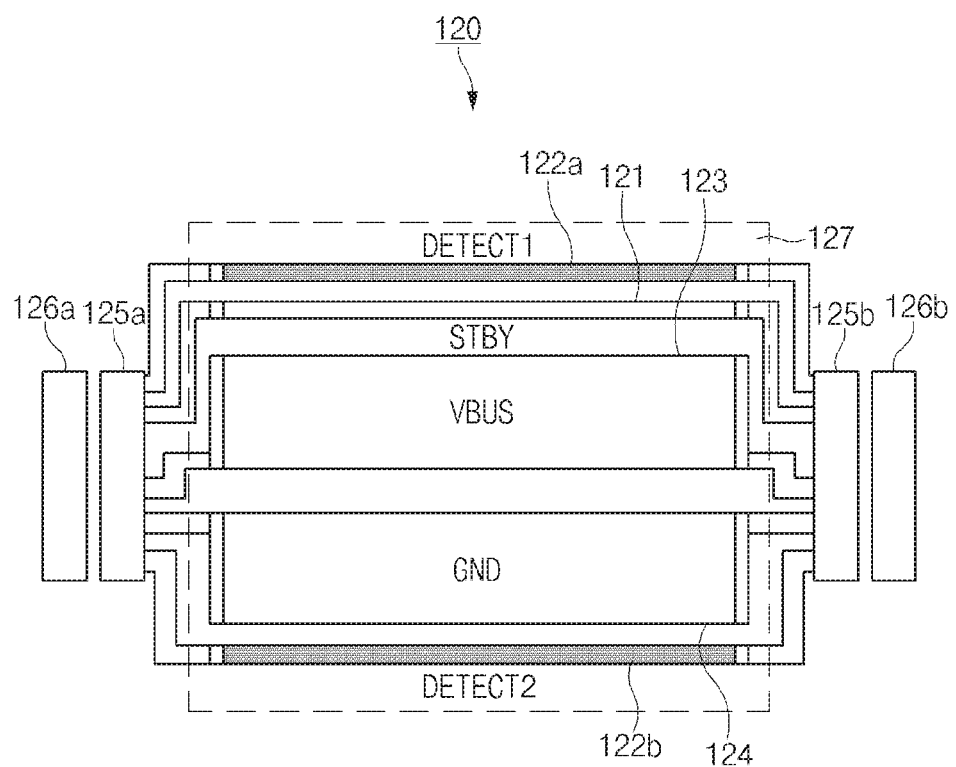
FIG. 3 is a circuit diagram illustrating a cable, according to an embodiment of the disclosure.

FIG. 3 is a circuit diagram illustrating a cable, according to an embodiment of the disclosure.

Referring to FIG. 3, the standby power transmission line 121, the first detect line 122a, the second detect line 122b, the main power transmission line 123, and the ground line 124 of the cable 120 may be formed by patterning a conductive material on a transparent film 127. For example, the transparent film 127 may be a polyethyleneterephthalate (PET) film.

According to an embodiment, the first detect line 122a and the second detect line 122b of the cable 120 may be formed at the outer end of the transparent film 127. As such, when the cable 120 is cut, the probability that at least one of the first detect line 122a and the second detect line 122b is preferentially cut may increase.

According to an embodiment, when the conductive line is generated by patterning a conductive material on the transparent film 127, a flexible flat cable (FFC) or a flexible printed circuit board (FPCB) 126a or 126b may be connected to opposite ends of the cable 120. According to an embodiment, a connector 125a or 125b may be connected to the FCC or the FPCB 126a or 126b of the cable 120. As such, the cable 120 may be connected to the display device 200 via the connector 125a or 125b.

According to an embodiment of the disclosure given with reference to FIGS. 1 to 3, the power supply device 100 may include the detect line 122a or 122b in the cable 120, may receive a power-on signal and a feedback signal of a standby power via the detect line 122a or 122b, may detect that the cable 120 is opened, through the power-on signal and the feedback signal when the cable 120 is opened, may turn off a portion outputting the main power of a power supply device 100, and may discharge the charged energy of the power supply device, thereby preventing a user from electric shock.

Furthermore, the power that is being supplied may be blocked by detecting that the cable 120 is opened, thereby ensuring the safety; the cable 120 may be made of a transparent film of an insulating material; the cable 120 made of a transparent film may match the design of the display device 200; because it is difficult for the user to recognize the cable 120, the cable 120 may not interfere with the concentration of the user.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A power supply device comprising:
 a power supply unit including a first power supply unit transmitting standby power to an electronic device and a second power supply unit transmitting main power to the electronic device; and
 a cable including a standby power transmission line transmitting the standby power to the electronic device, a main power transmission line transmitting the main power to the electronic device, a first detect line receiving a power-on signal for operating the second power supply unit from the electronic device, and a second detect line electrically connected to the electronic device,
 wherein the second power supply unit does not operate when the power-on signal is not received,
 wherein the first power supply unit includes a blocking circuit including a first switch which is electrically connected to the first detect line and the second detect line,
 wherein voltage applied to the first switch is determined by the second detect line, and
 wherein the first switch blocks the power-on signal received via the first detect line when the second detect line is opened.

2. The power supply device of claim 1, wherein the second power supply unit receives a feedback signal corresponding to the standby power transmitted to the electronic device, via the first detect line, and
 wherein the second power supply unit does not operate when the feedback signal is not received.

3. The power supply device of claim 2, wherein the second power supply unit receives a part of the standby power as the feedback signal.

4. The power supply device of claim 3, wherein the second switch is turned on and consumes the power charged by the second power supply unit when the power-on signal is not received.

5. The power supply device of claim 4, wherein the cable is connected to both the power supply unit and the electronic device, by connecting flexible flat cable (FFC) or flexible printed circuit board (FPCB) to opposite ends and connecting a connector to the FFC or the FPCB.

6. The power supply device of claim 1, wherein the second power supply unit includes a discharge circuit electrically connected to an output terminal of the second power supply unit, and
 wherein the discharge circuit is electrically connected to the output terminal of the second power supply unit and configured to discharge power charged by the second power supply unit when the power-on signal is not received.

7. The power supply device of claim 6, wherein the discharge circuit includes a first resistor and a second switch connected to the output terminal of the second power supply unit in series,
 wherein the second switch allows current to flow the first resistor and then consumes the power charged by the second power supply unit when the second switch is turned on, and
 wherein the second switch is turned on or off based on whether the power-on signal is received.

8. The power supply device of claim 1, wherein the first detect line and the second detect line are formed at the outer end of the cable.

9. The power supply device of claim 1, wherein the cable forms the standby power transmission line, the main power transmission line, the first detect line, and the second detect line by patterning a conductive material on a polyethyleneterephthalate (PET) film.

10. A power supply system comprising:
 a power supply unit including a first power supply unit transmitting standby power to an electronic device and a second power supply unit transmitting main power to the electronic device;
 a cable including a standby power transmission line transmitting the standby power to the electronic device, a main power transmission line transmitting the main power to the electronic device, a first detect line receiving a power-on signal for operating the second power supply unit from the electronic device, and a second detect line electrically connected to the electronic device; and a power receiving unit of the electronic device configured to receive the standby power and the main power from the power supply unit via the cable and to transmit the power-on signal via the first detect line, wherein the power receiving unit does not receive the main power because the second power supply unit does not operate when the power-on signal is not received, wherein the first power supply unit includes a blocking circuit including a first switch which is electrically connected to the first detect line and the second detect line, wherein voltage applied to the first switch is determined by the second detect line, and wherein the first switch blocks the power-on signal received via the first detect line when the second detect line is opened.

11. The power supply system of claim 10, wherein the power receiving unit transmits a feedback signal corresponding to the standby power received via the standby power transmission line to the power supply unit via the first detect line.

12. The power supply system of claim 11, wherein the power receiving unit includes a second resistor connected between the standby power transmission line and the first detect line, and wherein the power receiving unit transmits a part of the standby power, which is transmitted via the first detect line, as the feedback signal to the power supply unit via the second detect line.

* * * * *